United States Patent [19]

Hunt et al.

[11] Patent Number: 5,476,172
[45] Date of Patent: Dec. 19, 1995

[54] MODULAR RECORDING MEDIA STORAGE APPARATUS

[76] Inventors: Ronald E. Hunt, 211 Buck Bend, Georgetown, Tex. 78626; Verlon E. Whitehead, 8815 Mesa Dr., Austin, Tex. 78759

[21] Appl. No.: 262,244

[22] Filed: Jun. 20, 1994

[51] Int. Cl.⁶ .................................................. B65D 85/57
[52] U.S. Cl. ................... 206/308.1; 206/307; 220/23.4; 220/754
[58] Field of Search ................... 206/307, 308.1, 206/309; 220/23.4, 754, 759; 312/9.22, 9.29, 9.34, 9.38, 9.41, 9.42, 9.44, 9.58, 9.64

[56] References Cited

U.S. PATENT DOCUMENTS

| | | | |
|---|---|---|---|
| 896,637 | 8/1908 | Herrman | 312/9.44 |
| 1,153,963 | 9/1915 | Sengstock | 312/9.41 |
| 4,401,216 | 8/1983 | Koch | 220/23.4 |
| 4,702,533 | 10/1987 | Seifert | 312/9.22 |
| 4,753,343 | 6/1988 | Flynn | 206/307 |
| 4,875,743 | 10/1989 | Gelardi et al. | 206/309 |
| 4,969,568 | 11/1990 | Yoshida | 220/23.4 |
| 4,998,618 | 3/1991 | Borgions | 206/307 |
| 5,101,972 | 4/1992 | Hunt et al. | 206/309 |
| 5,165,583 | 11/1992 | Kouwenberg | 220/23.4 |

FOREIGN PATENT DOCUMENTS

| | | | |
|---|---|---|---|
| 2133388 | 7/1984 | United Kingdom | 220/23.4 |

*Primary Examiner*—Jimmy G. Foster
*Attorney, Agent, or Firm*—Max Ciccarelli; Andrew J. Dillon

[57] ABSTRACT

A modular, portable apparatus for storing and carrying a plurality of disc shaped recording media has a housing including a lower base component and an upper cover component. The lower base component and the upper cover component are pivotally coupled. Slots within the housing retain a plurality of disc shaped recording media in a plurality of parallel adjacent positions. A disc selector selects and automatically retains a particular one of said plurality of disc shaped recording media within the upper cover component while the remainder of said plurality of disc shaped recording media remain within said lower base component during pivotal movement of said upper cover component with respect to said lower base component. A connecting device on each of the two ends of the housing is adapted to selectively couple the modular apparatus to either an end of another identical modular apparatus or a carrying device for carrying the modular apparatus. Thus, a selected plurality of modular apparatuses can be selectively coupled together and to the carrying device to allow convenient carrying of said selected plurality of modular apparatuses.

5 Claims, 3 Drawing Sheets

MODULAR RECORDING MEDIA STORAGE APPARATUS

BACKGROUND OF THE INVENTION

1. Field of the Invention

The present invention relates in general to storage devices for recording media and in particular to modular storage devices for storing and carrying disc shaped recording media. Still more particularly, the present invention relates to a modular apparatus for storing and carrying a large number of disc shaped recording media in a modular apparatus that is selectively connectable to either other modular apparatuses or a carrying means.

2. Description of the Prior Art

Storage devices for recording media are generally known. One particular type of storage device is shown in U.S. Pat. No. 5,101,972, entitled "Recording Media Storage Apparatus" and issued to Ronald E. Hunt and Shari M. Hunt on Apr. 7, 1992. The storage device of the '972 patent solves several of the problems encountered in ideally handling and storing records and compact discs due to their delicate, flat, recorded surfaces. The storage device of the '972 patent allows more recording media to be stored in a smaller volume than was previously possible.

However, there is room for improvement. For example, due to the popularity of recording media such a compact discs, the proliferation of mobile compact disc players, and the desire of recording media users to carry with them varying numbers of recording media, it has become necessary to have a modular apparatus for storing and carrying recording media. No modular apparatus is currently available for efficiently carrying and ideally handling a large number of recording media.

Thus, a need exists for a modular storage apparatus which can be configured in a variety of ways so as to efficiently store and carry a varied number of recording media. The modularity of the apparatus is important because users wish to carry with them different number of recording media at different times. Hence, the apparatus must allow a varying storage capacity. Also, the modular apparatus must provide an efficient and versatile carrying method. Furthermore, the recording media in the modular apparatus must be easily and conveniently accessible by the user.

SUMMARY OF THE INVENTION

It is therefore an object of the present invention to provide an improved modular apparatus for storing and carrying recording media.

It is another object of the present invention to provide an improved modular apparatus for storing and carrying disc shaped recording media.

It is yet another object of the present invention to provide a modular apparatus for storing and carrying disc shaped recording media wherein each modular apparatus can be connected to either another apparatus, to a carrying means, or to both so as to provide maximum modularity.

The foregoing as well as additional objects are achieved as is now described. The modular, portable apparatus for storing and carrying a plurality of disc shaped recording media has a housing including a lower base component and an upper cover component. The lower base component and the upper cover component are pivotally coupled. Slots within the housing retain a plurality of disc shaped recording media in a plurality of parallel adjacent positions. A disc selector selects and automatically retains a particular one of said plurality of disc-shaped recording media within the upper cover component while the remainder of said plurality of disc shaped recording media remain within said lower base component during pivotal movement of said upper cover component with respect to said lower base component. A connection means on each of the two ends of the housing are adapted to selectively couple the modular apparatus to either an end of another identical modular apparatus or a carrying means for carrying the modular apparatus. Thus a selected plurality of modular apparatuses can be selectively coupled together and to the carrying means to allow convenient carrying of said selected plurality of modular apparatuses.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
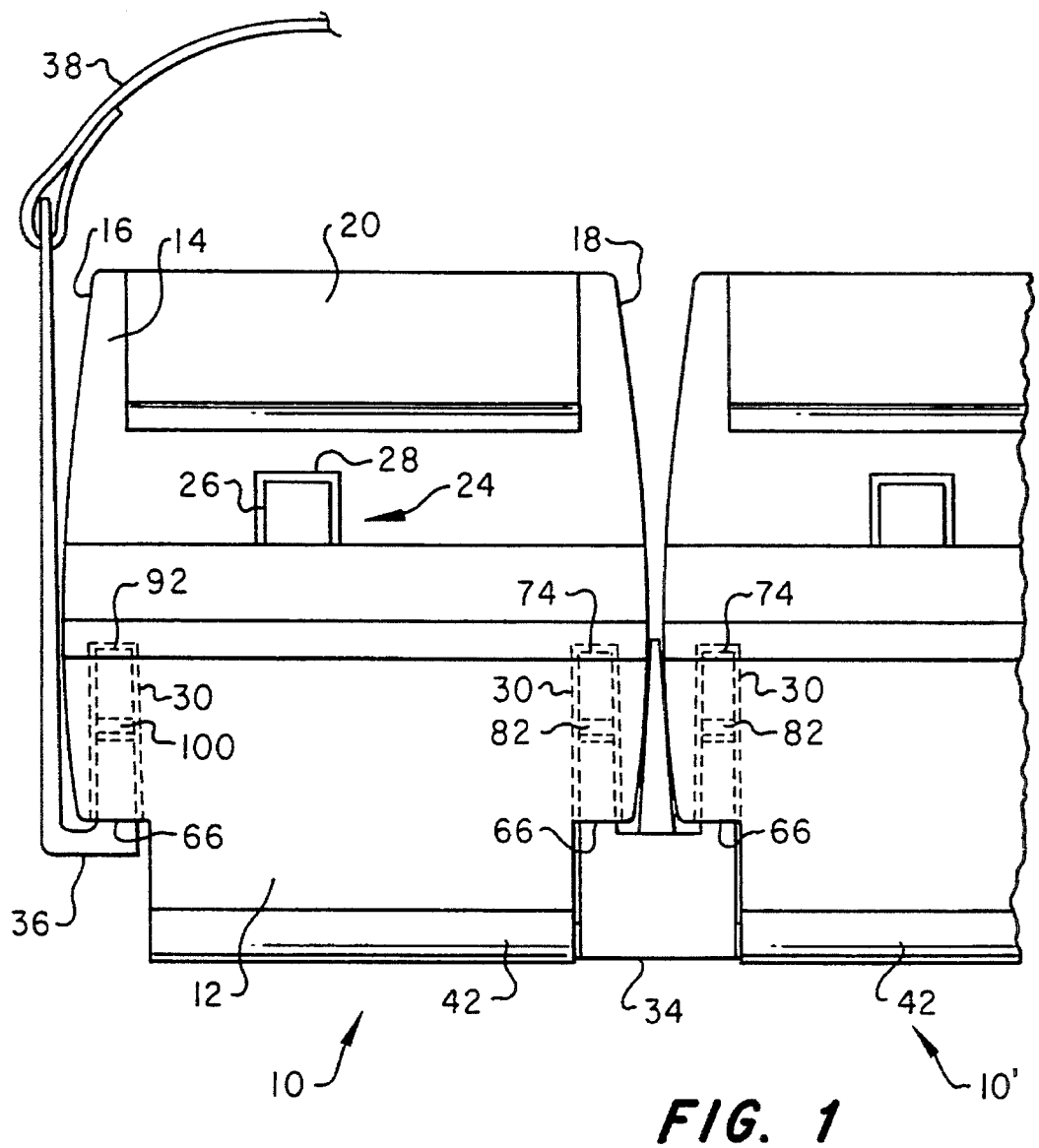
FIG. 1 is a front view of the novel modular disc storage apparatus of the present invention.

With reference now to the figures and in particular with reference to FIG. 1, a front view of the modular disc storage apparatuses 10 and 10' of the present invention is shown. As illustrated, modular disc storage apparatus 10 includes a lower base component 12 and an upper cover component 14. Lower base component 12 and upper cover component 14 are utilized to form a generally cylindrical storage apparatus of dimension slightly larger than the disc shaped recording media to be stored. Ends 16 and 18 cooperate with lower base component 12 and upper cover component 14 to create a portable housing means to fully enclose the cylindrical storage space defined thereby.

Figure 2:
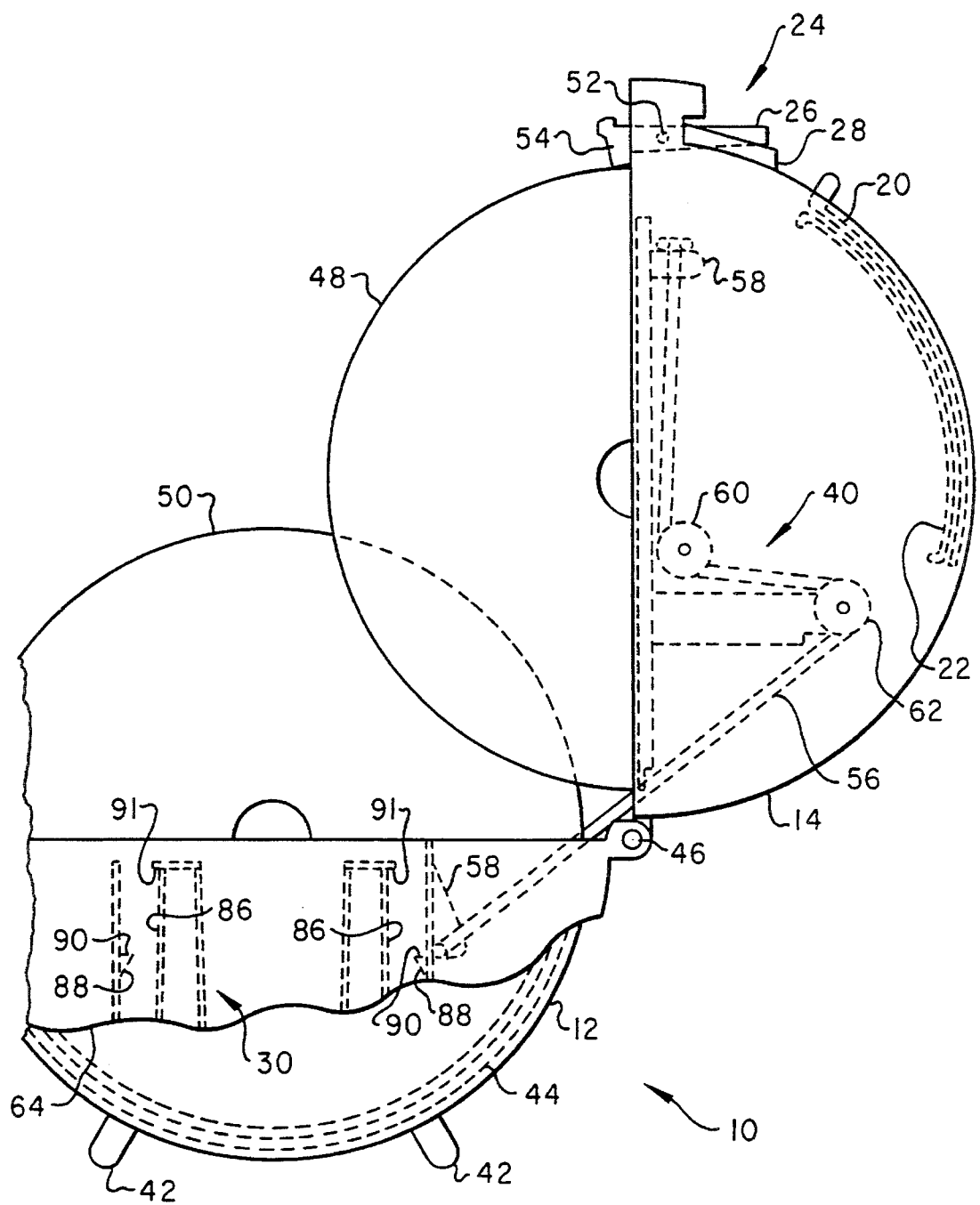
FIG. 2 is a side view of the novel modular disc storage apparatus of the present invention.

Also depicted in FIGS. 1 and 2 is an opaque label cover 20 which can be retracted along upper cover component 14 to reveal a label means 22 located below label cover 20. Label means 22 can be any one of the label means well known to those skilled in the art, and is used to identify each disc shaped recording media stored within disc storage apparatus 10. The retractable opaque label cover 20 allows the selective revealment of label means 22.

Also depicted in FIG. 1 is disc selector means 24 comprising selector knob 26 which is mounted within selector housing 28. Selector knob 26 may be used, in a manner which will be explained in greater detail herein, to select and automatically retain a particular one of a plurality of disc shaped recording media within upper cover component 14 while the remainder of the plurality of disc shaped recording media within disc storage apparatus 10 remain within lower base component 12, during pivotal movement of upper cover component 14 with respect to lower base component 12.

Also depicted in FIG. 1 are connection means 30, one located at one end of disc storage apparatus 10, and the other located at the other end of disc storage apparatus 10. Each connection means 30 is located interiorly of ends 16 and 18 of disc storage apparatus 10 so as to be hidden from view. Connection means 30 are adapted to be selectively coupled to either apparatus coupling means 34 or to strap coupling means 36. FIG. 1 shows apparatus coupling means 34 connecting disc storage apparatuses 10 and 10'. FIG. 1 also shows strap coupling means 36 connecting disc storage apparatus 10 to strap 38. The structure and operation of connection means 30, apparatus coupling means 34, and strap coupling means 36, are explained in more detail herein.

With reference now to FIG. 2, there is depicted a side view of disc storage apparatus 10 of the present invention illustrating the removal of a single disc therefrom, and also illustrating cover biasing means 40, and connection means 30. As illustrated, lower base component 12 has legs 42 for maintaining disc storage apparatus 10 in a horizontal position. Lower base component 12 also has a plurality of slot means 44 to retain a plurality of discs 50 in a plurality of parallel adjacent positions within lower base component 12.

As illustrated in FIG. 2, cover component 14 may be pivoted with respect to lower base component 12 by means of hinge 46. Selector knob 26 is effective to select a particular disc 48 and retain disc 48 within upper cover component 14 during pivotal movement of upper cover component 14 with respect to lower base component 12. Thus, upon reference to FIG. 2, those skilled in the art will appreciate that a selected disc 48 may then be manually removed from upper cover component 14 while the remaining discs 50 are stored within lower base component 12.

A variety of disc selector means for selecting a disc and retaining said disc within upper cover component 14 can be used. U.S. Pat. No. 5,101,972 discloses a pull-to-select selector knob. In the '972 patent, the knob is pulled to allow selection and is released to engage the desired disc. The present embodiment shows a different type of selector knob 26. In the present embodiment, knob 26 is pressed to allow selection, and is released to engage the desired disc 48. When knob 26 is pressed, it pivots about pivot 52 so that head portion 54 of knob 26 is displaced away from disc 48. This allows selector means 24 to be moved along the front of upper cover component 14. Conventional means, such as the detent teeth shown in the '972 patent, are used to allow accurate disc selection. When knob 26 is released, a spring (not shown) biases head portion 54 of knob 26 toward disc 48 and causes head portion 54 to engage the circumferential edge of disc 48. Once head portion 54 engages selected disc 48, upper cover component 14 is pivoted about hinge 46 and the selected disc 48 is retained within upper cover component 14 and separated from discs 50 which remain in lower base component 12.

Still referring to FIG. 2, cover biasing means 40 is also illustrated. Cover biasing means 40 uses an elongate elastic member, or o-ring, 56. O-ring 56 is secured at one end to lower base component 12 and at another end to upper cover component 14. Retaining means 58, one located in lower base component 12 and one in upper cover component 14, are used to secure o-ring 56 by conventional means, such as, for example, passing o-ring 56 through apertures in retaining means 58 and then tieing knots at the ends of o-ring 56. O-ring 56 is passed through a series of pulleys 60 and 62. Pulleys 60 and 62 are located so as to make the length of o-ring 56 such that the desired amount of elasticity is obtained. O-ring 56 is sized so that when upper cover component 14 is in the closed position, and o-ring 56 is thus in its shortest state, the desired amount of biasing force is obtained.

Also, pulley 62 is located so that when upper cover component 14 is at the position shown in FIG. 2, o-ring 56 follows a path from lower base component 12 to upper cover component 14 in which o-ring 56 is adjacent to hinge 46, as shown in FIG. 2. The path of o-ring 56 described above results in a biasing force that forces lower base component 12 and upper cover component 14 toward each other when upper cover component 14 is in any position between the closed position and the position shown in FIG. 2. In these positions, the moment arm that tends to rotate upper cover component 14 toward the closed position varies between a maximum value when upper cover component 14 is in the closed position, and a minimum value, close to zero, when upper cover component 14 is in the position shown in FIG. 2. On the other hand, when upper cover component 14 is in any position beyond the position shown in FIG. 2, the biasing force decreases to around zero because the moment arm that tends to pivot upper cover component 14 toward the closed position is substantially zero.

In operation, cover biasing means of FIG. 2 biases upper cover component 14 and lower base component 12 toward each other except when the user opens upper cover component 14 beyond the position shown in FIG. 2, at which point the biasing force becomes nearly zero so that cover component 14 remains in the open position. When the user desires to close upper cover component 14, he or she moves it to the position of FIG. 2 at which point biasing means 40 biases upper cover component 14 to the closed position. The use of biasing means 40 in conjunction with upper cover component 14 and lower base component 12 allows for easy and convenient access to the storage space within disc storage apparatus 10.

Also shown in FIGS. 1 and 2 is a handle means formed by the curvilinear profile 64 of the lower portion of each end 16 and 18 of disc storage apparatus 10. The lower portions of ends 16 and 18 create a downward facing shoulder 66. The curvilinear profile 64 of downward facing shoulder 66 creates a convenient carrying means which conforms to the human hand for carrying or holding disc storage apparatus 10.

Figure 3:
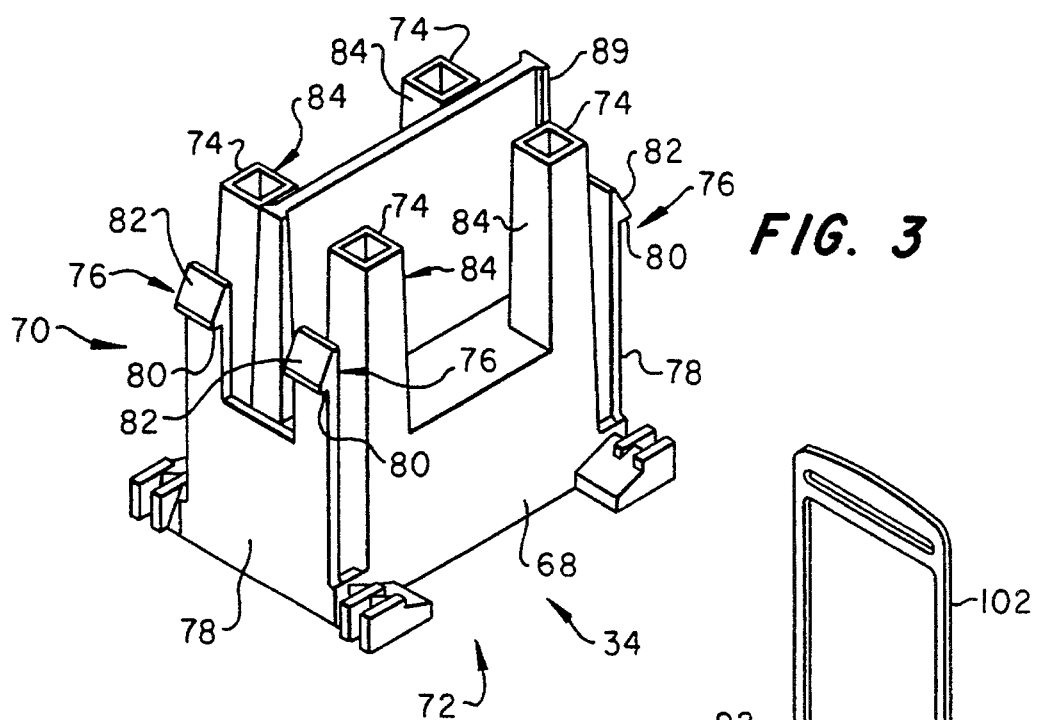
FIG. 3 is a perspective view of the apparatus coupling means of the present invention.

Referring now mainly to FIG. 3, an apparatus coupling means 34 is shown. Apparatus coupling means 34 has a body 68. Body 68 has two ends 70 and 72. End 70 has two guide posts 74 and two latches 76. End 72 also has two guide posts 74 and two latches 76. Each guide post 74 and adjacent latch 76 are adapted to releasable fit into and engage a connection means 30 as explained in more detail herein. Each latch 76 is attached to one of the two flexible arms 78. Each latch 76 has a downward facing shoulder 80 and a camming surface 82.

Apparatus coupling means 34 operates as follows. Referring mainly to FIGS. 1, 2, and 3, as end 70 of apparatus coupling means 34 is slid into connection means 30 of disc storage apparatus 10, surface 84 of guide post 74 slides along surface 86 of connection means 30 to guide apparatus coupling means 34 into connection means 30. As apparatus coupling means 34 slides into connection means 30, camming surface 82 of latch 76 contacts protrusion 88 and causes flexible arm 78 to be deflected inward. As apparatus coupling means 34 is pushed further into connection means 30, camming surface 82 eventually clears protrusion 88 and flexible arm 78 deflects outward once again. When flexible arm 78 deflects outward, downward facing shoulder 80 of latch 76 is in contact with upward facing shoulder 90 of connection means 30 and apparatus coupling means 34 is prevented from sliding out of connection means 30. Stop 91 prevents apparatus coupling means 34 from sliding too far into connection means 30. Stabilizing member 89 fits between the adjacent storage apparatuses 10 and helps to stabilize the same. When removal of apparatus coupling means 34 from connection means 30 is desired, flexible arm 78 is manually deflected inward so that downward facing shoulder 80 of latch 76 clears protrusion 88 and apparatus coupling means 34 can slide out of connection means 30.

Figure 5:
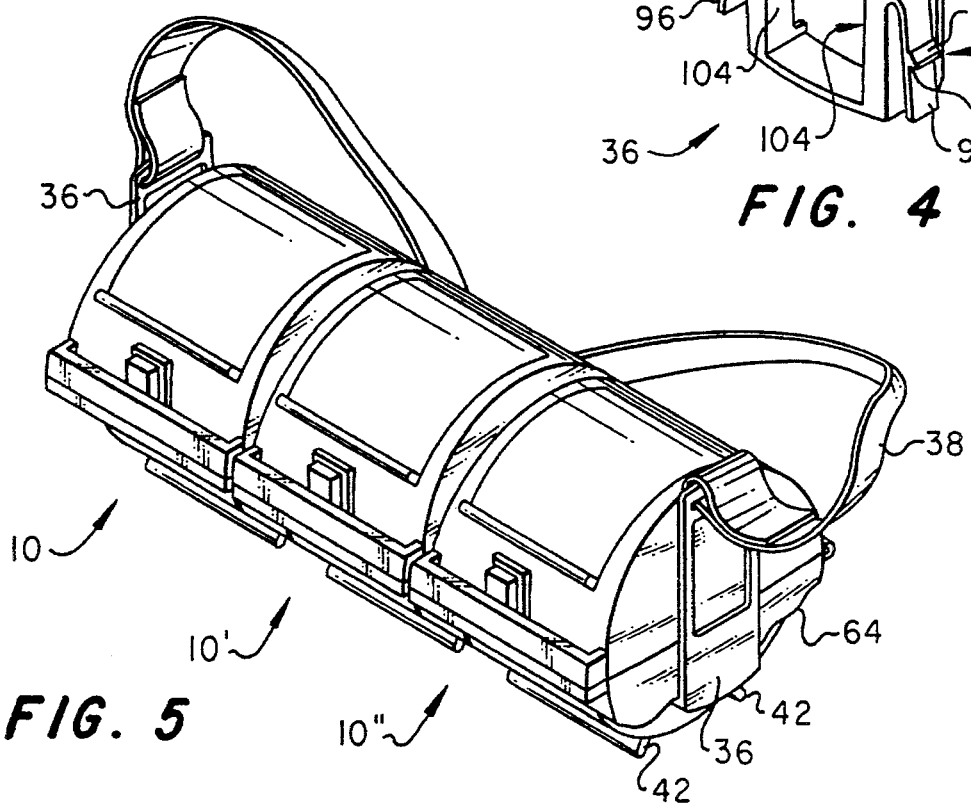
FIG. 5 is a perspective view of the modular disc storage apparatus of the present invention showing three apparatuses coupled together and to a strap.

Likewise, end 72 of apparatus coupling means 34 can be similarly selectively coupled to a connection means 30 of another identical disc storage apparatus 10' as depicted in FIG. 1. In fact, any number of disc storage apparatuses 10, can be similarly selectively coupled together. For example, FIG. 5 shows three such disc storage apparatuses 10, 10', and 10" coupled together.

Figure 4:
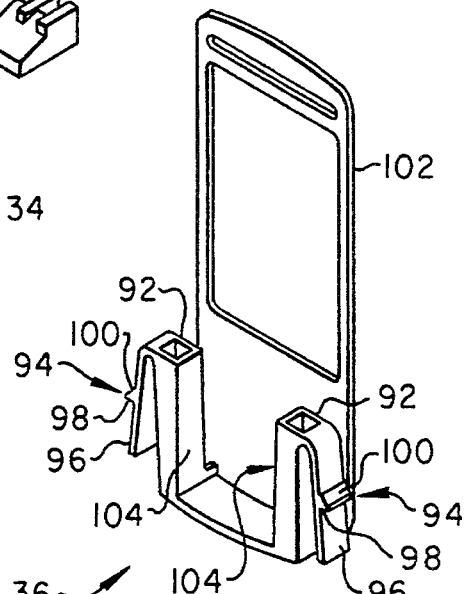
FIG. 4 is a perspective view of the strap coupling apparatus of the present invention.

Referring now to FIG. 4, strap coupling means 36 is depicted. Strap coupling means 36 has two guide posts 92, and two latches 94. Each latch 94 is connected to a flexible arm 96. Each latch 94 has a downward facing shoulder 98 and a camming surface 100, which function as explained in more detail herein. Strap coupling means 36 also has a strap engaging section 102 for connecting strap coupling means 36 to strap 38.

Strap coupling means 36 operates as follows. Referring mainly to FIGS. 1, 2, and 4, as strap coupling means 36 is slid into connection means 30 of disc storage apparatus 10, surface 104 of guide post 92 slides along surface 86 of connection means 30 to guide strap coupling means 36 into connection means 30. As strap coupling means 36 slides into connection means 30, camming surface 100 of latch 94 contacts protrusion 88 and causes flexible arm 96 to be deflected inward. As strap coupling means 36 is pushed further into connection means 30, camming surface 100 eventually clears protrusion 88 and flexible arm 96 deflects outward once again. When flexible arm 96 deflects outward, downward facing shoulder 98 of latch 94 is in contact with upward facing shoulder 90 of connection means 30 and strap coupling means 36 is prevented from sliding out of connection means 30. Stop 91 prevents strap coupling means 36 from sliding too far into connection means 30. When removal of strap coupling means 36 from connection means 30 is desired, flexible arm 96 is manually deflected inward so that downward facing shoulder 98 of latch 94 clears protrusion 88 and strap coupling means 36 can slide out of connection means 30. Strap 38 is connected to strap engaging section 102 of strap coupling means 36 by conventional means.

Each connection means 30 of disc storage apparatus 10 can be connected to either an apparatus coupling means 34 or a strap coupling means 36. The above versatility allows the modular disc storage apparatus 10 of the present invention to be used to create a wide variety of disc storage and carrying arrangements. For example, FIG. 5 shows three disc storage apparatuses 10, 10', and 10" connected together by two apparatus coupling means 34 (not visible) and having a strap 38 connected at one end to a strap coupling means 36 connected to disc storage apparatus 10 and connected at the other end to a strap coupling means 36 connected to disc storage apparatus 10". Different arrangements of from one to several disc storage apparatuses can be easily obtained by selectively combining a selected number of disc storage apparatuses 10, apparatus coupling means 34, and strap coupling means 36 to form the desired arrangement.

Upon reference to the foregoing, those skilled in the art will appreciate that the Applicants herein have provided a novel modular disc shaped recording media storage apparatus which permits a plurality of discs to be stored in closely spaced parallel relationship and which permits varying numbers of storage apparatuses to be coupled together and to a strap carrying means, thus allowing versatile configurations of said apparatuses. The novel disc storage apparatus of the present invention includes a novel cover biasing means which selectively biases the upper cover component toward the closed position by providing substantial biasing force only when the upper cover component is in certain positions. The disc storage apparatus of the present invention also includes an integrated curvilinear handle means which conforms to the human hand for carrying or holding the disc storage apparatus. Thus, the lack of an efficient, modular disc storage system is solved by the novel design of the present invention.

While the invention has been particularly shown and described with reference to a preferred embodiment, it will be understood by those skilled in the art that various changes in form and detail may be made therein without departing from the spirit and scope of the invention. It is therefore contemplated that the appended claims will cover any such modifications or embodiments that fall within the true scope of the invention.

What is claimed is:

1. A modular apparatus for storing and carrying a plurality of disc shaped recording media, each having an outer circumferential edge, said apparatus comprising:

portable housing means including a lower base component and an upper cover component, said portable housing means having two ends;

means for pivotally coupling said lower base component and said upper cover component;

slot means within said portable housing means for retaining a plurality of said disc shaped recording media in a plurality of parallel adjacent positions; and disc selector means for selecting and automatically retaining a particular one of said plurality of disc shaped recording media within said upper cover component while the remainder of said plurality of disc shaped recording media remain within said lower base component during pivotal movement of said upper cover component with respect to said lower base component;

connection means on each of said two ends of said portable housing adapted to selectively couple said modular apparatus to either an end of another identical modular apparatus or a carrying means for carrying the modular apparatus; and wherein a selected plurality of modular apparatuses can be selectively coupled together and to the carrying means to allow convenient carrying of said selected plurality of modular apparatuses.

2. The modular apparatus for storing and carrying a plurality of disc shaped recording media according to claim 1 further comprising:

apparatus coupling means for coupling two identical modular apparatuses to each other, said apparatus coupling means having a first end for selective engagement with a connection means of said modular apparatus and a second end for engagement with a connection means of said another modular apparatus, wherein said apparatus coupling means allows said plurality of modular apparatuses to be selectively coupled together.

3. The modular apparatus for storing and carrying a plurality of disc shaped recording media according to claim 1 further comprising:

strap coupling means for coupling one end of a selected one of said plurality of modular apparatuses to a strap means for carrying said plurality of modular apparatuses, said strap coupling means having a first end for selective engagement with a connection means of said selected one of said plurality of modular apparatuses and a second end for selective engagement with said strap means, wherein said strap means can be selectively used for convenient carrying of said plurality of modular apparatuses.

4. The modular apparatus for storing and carrying a plurality of disc shaped recording media according to claim 1 further comprising:

an elongate elastic member secured at one end to the lower base component and at another end to the upper cover component wherein said elongate elastic member selectively biases said lower base component and said upper cover component toward a closed position.

5. The modular apparatus for storing and carrying a plurality of disc shaped recording media according to claim 1 further comprising:

an integrated handle means at each end of said apparatus, said integrated handle means comprising a curvilinear profile which conforms to the human hand for carrying or holding said apparatus.

* * * * *